Figure 1A:
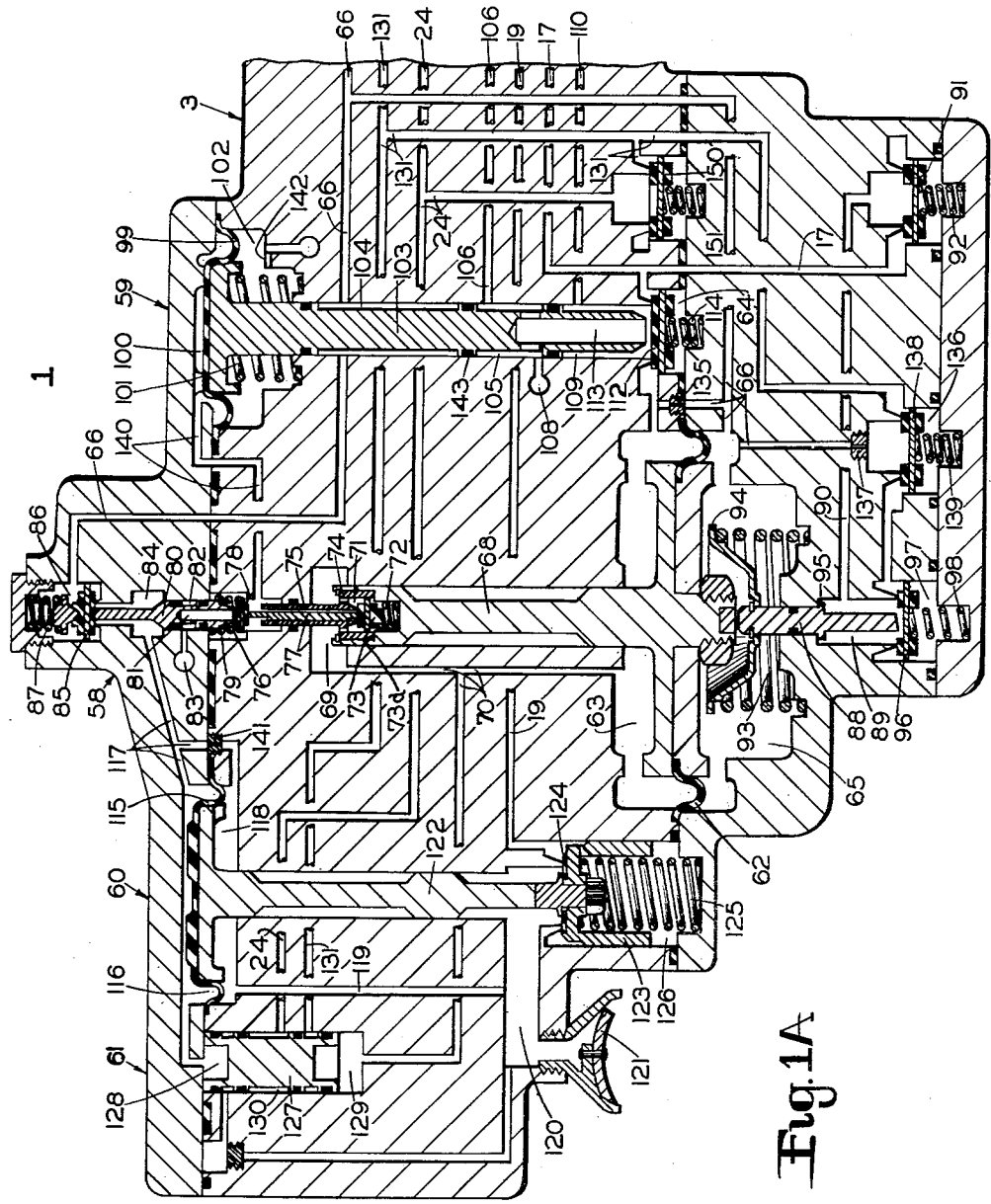

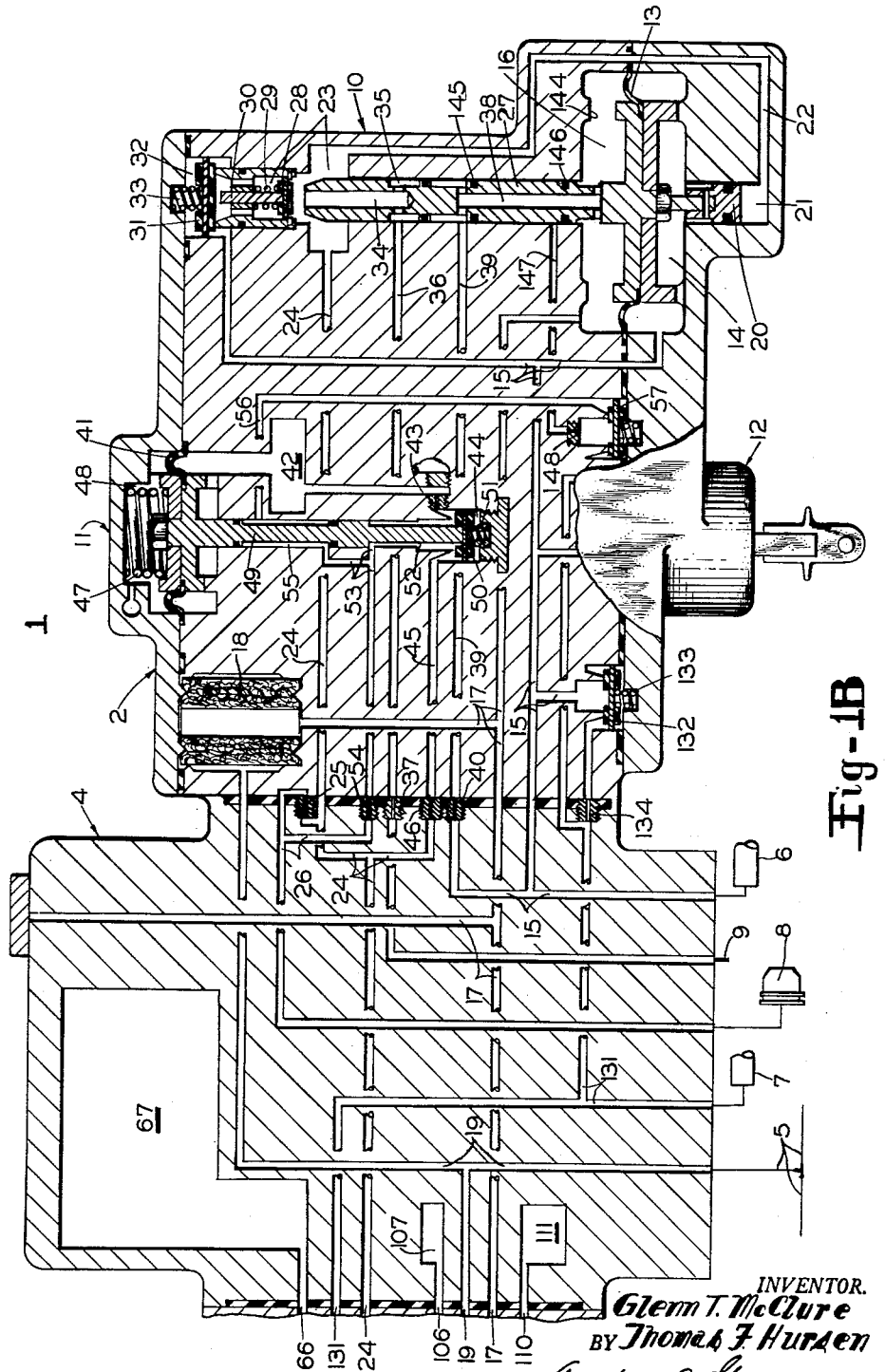

United States Patent Office 2,994,565
Patented Aug. 1, 1961

2,994,565
BRAKE PIPE VENTING CONTROL INCLUDING QUICK SERVICE, VENT AND PILOT VALVES
Glenn T. McClure, McKeesport, and Thomas F. Hursen, Monroeville, Pa., assignors to Westinghouse Air Brake Company, Wilmerding, Pa., a corporation of Pennsylvania
Filed Apr. 28, 1958, Ser. No. 731,267
5 Claims. (Cl. 303—82)

This invention relates to brake controlling valve devices especially adapted for use on railway cars and relates more particularly to an improved valve device of the above general type.

It has heretofore been proposed to provide a brake controlling valve device which will continuously (that is, without interruption) effect local quick service reductions in brake pipe pressure either in one or two stages. With such valve devices, the quick service reduction in brake pipe pressure must be limited in rate and degree so as to prevent initiation of an undesired emergency application of brakes by undesired operation of an emergency valve that responds to a reduction in brake pipe pressure in excess of a certain degree below pressure of fluid in a quick action chamber to cause opening of a brake pipe vent valve and a consequent rapid and complete venting of the brake pipe. It is desirable, however, to effect greater local quick service reductions in brake pipe pressure than heretofore possible in order to assure a higher rate of propagation of a brake pipe pressure reduction wave rearward through a train and thereby effect a more nearly simultaneous initiation of a service application of brakes on all cars through a train.

To this end and according to the invention, an improved brake controlling valve device is provided embodying novel means for effecting "continual" (that is, interrupted but repeated) limited quick service reductions in brake pipe pressure and "continual" limited but greater quick service reductions in quick action chamber pressure whenever and so long as brake pipe pressure is being reduced at the locomotive at a service rate. With such a valve device, greater overall quick servicve reductions in brake pipe pressure can be effected without causing an undesired emergency application of brakes than can be effected with brake controlling valve devices of types heretofore proposed. Also, the local quick service reductions in brake pipe pressure will be effected not only upon an initial service rate of reduction in brake pipe pressure but also upon successive further service reductions in brake pipe pressure effected to apply brakes to correspondingly greater degrees, such as while descending a grade.

According to the invention, the improved brake controlling valve device embodies novel valve means controlled by brake pipe pressure and pressure of fluid in a quick action chamber having restricted connection with the brake pipe and operative to control supply of fluid under pressure to, and venting of, another chamber that controls operation of a quick service valve device and also controls operation of a normally closed brake pipe vent valve and a high pressure valve and also controls fluid flow from an emergency reservoir to the brake pipe via a normally closed accelerated release communication containing a backflow check valve to prevent flow therethrough in the reverse direction.

More specifically, this valve means is operative to a normal position for venting said other chamber when brake pipe pressure is substantially equal to, or not more than a predetermined degree greater than, quick action chamber pressure, and is operative to another position for supplying fluid under pressure to said other chamber when brake pipe pressure is reduced not exceeding a certain degree below quick action chamber pressure, and is operative when said certain degree is exceeded to an emergency position for supplying fluid under pressure to said other chamber and also connecting the quick action chamber to a control chamber that is open to atmosphere via a timing or blowdown choke.

The quick service valve device responds to charging of said other chamber to effect a limited local quick service reduction in brake pipe pressure and also effect a limited but greater quick service reduction in quick action chamber pressure, such that if brake pipe pressure is being reduced at a service rate said certain degree will not be exceeded and said valve means will be caused to return to its normal position by temporary reduction in quick action chamber pressure to below the existing value of brake pipe pressure, for again venting said other chamber. Hence, while and so long as brake pipe pressure is being reduced at a service rate, the valve means and quick service valve device will cooperate in such manner as to effect continual or repeated local quick service reductions in brake pipe pressure and greater quick service reductions in quick action chamber pressure.

If, however, brake pipe pressure is reduced at an emergency rate, the valve means will cause single limited reductions in brake pipe pressure and quick action chamber pressure to be effected; but since the reduction thus effected in quick action chamber pressure will be insufficient to exceed the rapidly reducing value of brake pipe pressure, the differential between brake pipe pressure and quick action chamber pressure will exceed said certain degree and cause the valve means to move to emergency position in which quick action chamber pressure will equalize into the control chamber for causing opening of the brake pipe vent valve and also causing operation of the high pressure valve (which is subject opposingly to control chamber pressure and brake pipe pressure) to connect the emergency reservoir to a brake cylinder.

This valve means also responds to a preponderance in brake pipe pressure over quick action chamber pressure in excess of the aforementioned predetermined degree to permit fluid flow from the emergency reservoir to the brake pipe via the accelerated release communication to effect a rapid local increase in brake pipe pressure for assisting in more uniformly initiating a release of brakes through the train. Another valve permits fluid flow only from the brake cylinder to the emergency reservoir, so that when the accelerated release communication is opened during release of an emergency application of brakes, fluid may also flow from the brake cylinder in bypass of the high pressure valve to the emergency reservoir and thence into the brake pipe.

The improved brake apparatus also includes an improved balanced service valve device of the diaphragm and follower type which is pressure balanced. Said service valve device when in a lap position and in a brake application position connects the brake pipe to a restricted one-way flow communication through which fluid under pressure may flow only from the brake pipe to the brake cylinder at a very restricted rate provided an inshot valve device, which is interposed in said communication and controlled by brake cylinder pressure opposing a spring bias is in a position in which it establishes an inshot communication permitting relatively rapid flow from the service valve device to the brake cylinder, whereby said service valve device and inshot valve device will cooperate to permit flow from the brake pipe to the brake cylinder only during initiation of a brake application or if brake cylinder pressure should reduce, due to leakage, below a certain value as determined by said spring bias while brakes are applied.

The invention will be better understood from the following description and from the accompanying drawings, wherein FIGS. 1A and 1B, when taken together such that the right-hand edge of FIG. 1A is matched with the left-hand edge of FIG. 1B, constitute a diagrammatic view of a brake apparatus embodying the invention.

Description

As shown in the drawings, the brake apparatus embodying the invention comprises a brake controlling valve device 1 that, in turn, comprises a service portion 2 and an emergency portion 3 that are mounted on faces of a pipe bracket 4. To the pipe bracket 4 are connected a branch of a brake pipe 5 that extends through the train, an auxiliary reservoir 6, an emergency reservoir 7, a brake cylinder 8, and a brake cylinder release pipe 9.

The service portion 2 comprises a sectionalized casing containing a balanced service valve device 10, an inshot valve device 11, and also a manual reservoir release valve device 12 (not shown in detail).

The service valve device 10 comprises a movable abutment 13 of the diaphragm and follower type, having at one side a chamber 14 open via a passage 15 to the auxiliary reservoir 6 and having at the opposite side a chamber 16 open via a passage 17, strainer 18 and passage 19 to the brake pipe 5. Coaxially connected to one side of movable abutment 13 is a stem 20 that is sealingly slidable in an aligned bore open at one end to chamber 14 and open at the other end to a chamber 21 that is constantly connected to the brake cylinder 8 via a passage 22, a chamber 23, a passage 24, a brake cylinder application choke 25, and a passage 26. Coaxially connected to the opposite side of movable abutment 13 is a cylindrical slide valve 27 that is sealingly slidable in an aligned bore extending between chambers 16 and 23. Arranged coaxially with slide valve 27 is a poppet-type brake cylinder release valve 28 that is disposed in chamber 23 and normally biased by a helical spring 29 in the direction of slide valve 27 and into contact with a retaining ring carried by the casing. When valve 28 is so biased, a pusher stem 30 coaxially connected to the spring-pressed side of said valve is spaced from a coaxially arranged poppet-type brake cylinder supply valve 31 which is contained in a chamber 32 open to a branch of auxiliary reservoir passage 15, with the result that a helical spring 33 in chamber 32 will seat valve 31 against a valve seat rib encircling chamber 23.

When brake pipe pressure in chamber 16 exceeds auxiliary reservoir pressure in chamber 14, the movable abutment 13 and hence slide valve 27 will be biased to a release position, in which they are shown. With slide valve 27 in this position, the free end of said valve is spaced from release valve 28 for venting the brake cylinder 8 by uncovering chamber 23 and hence said brake cylinder to a brake cylinder release communication including a bore-like opening 34 that extends inwardly from said free end and is connected via radial ports to an elongated annular cavity 35 which is formed in valve 27 intermediate its ends and is constantly open to the brake cylinder release pipe 9 via a passage 36 and brake cylinder release choke 37. Also, brake cylinder supply valve 31 will be seated by spring 33 for cutting off chamber 32 and there by auxiliary reservoir 6 from the chamber 23 and thereby from the brake cylinder 8. Also, a passageway 38 formed in valve 27 and constantly open to the brake pipe 5 via chamber 16 will be uncovered to a passage 39 for permitting brake pipe fluid to flow via said passageway, passage 39, and an auxiliary reservoir charging choke 40 to a branch of auxiliary reservoir passage 15 for charging the auxiliary reservoir 6 to equality with brake pipe pressure at the rate controlled by said choke.

The inshot valve device 11 comprises a movable abutment 41 subject at one side to pressure of fluid in a volume 42 having restricted connection with the brake cylinder 8 via a choke 43, a chamber 44, a passage 45, a baffle choke 46, and a branch of passage 24, said movable abutment being subject at the opposite side to pressure of a helical bias spring 47 in an atmospheric chamber 48. Coaxially connected to movable abutment 41 is a cylindrical slide valve 49 that is sealingly slidable in an aligned bore open at its respective ends to volume 42 and chamber 44.

When brake cylinder pressure as noted in volume 42 is less than a preselected value, such as about 10 p.s.i. as determined by spring 47, the movable abutment 41 will be so positioned as to cause the free end of valve 49 to abut and unseat a coaxially arranged poppet-type inshot valve 50 against resistance of a bias spring 51 for connecting passage 45, via an elongated annular cavity 52 surrounding valve 49, to a passage 53 that is open via an inshot baffle choke 54 to brake cylinder passage 26; and, at the same time, an elongated annular cavity 55 in valve 49 will uncover a branch of passage 53 to a passage 56 leading to a chamber containing a backflow check valve 57 that is provided for the purpose hereinafter to be described.

The emergency portion 3 comprises a sectionalized casing containing a combined emergency and continual quick service pilot valve device 58, a quick service valve device 59, a vent valve device 60 and a high pressure valve device 61.

Valve device 58 comprises a movable abutment 62, preferably of the diaphragm and follower type, having at one side a chamber 63 open to the brake pipe 5 via a chamber 64 and branch of passage 17, and having at the opposite side a chamber 65 open via a passage 66 to a quick action chamber 67. Movable abutment 62 has a coaxially arranged stem 68 that has guided contact within a bore open at one end to chamber 63 and open at the opposite end to a chamber 69 that is connected via a passage 70 to chamber 63. Extending coaxially inward from the free end of stem 68 is a stepped bore-like recess 71, the base of which provides a seat for a helical spring 72 that acts on a disc-shaped supply valve 73 to bias it into seating contact with an annular valve seat rib formed in an annular valve seat member 74 that is disposed in said recess and positively connected to the stem 68, as by a retaining ring, and is perforated radially outward of the valve seat rib to permit free flow of fluid between chamber 69 and the recess 71. The member 74 has a coaxially arranged integrally formed sleeve-like portion 75 which extends through a casing partition separating chamber 69 from a chamber 76 and projects into chamber 76; said portion, intermediate its ends, having sealing slidably guided contact with the wall of an aligned bore through said casing partition. Slidably mounted within this sleeve-like portion 75 is a fluted stem 77 of a coaxially arranged disc-shaped release valve 78 that is disposed in chamber 76 and is biased by a helical spring 79 out of seating contact with an annular valve seat rib which is formed at one end of a generally cylindrical plunger 80; said seat rib encircles a bore-like opening 81 that is formed in said plunger and constantly open to an elongated annular cavity 82 in said plunger that, in turn, is constantly open to a vent port 83 in the casing. Intermediate its ends, plunger 80 has sealing slidably guided contact with the wall of an aligned bore through a casing partition separating chamber 76 from a chamber 84. The end of plunger 80 which projects into chamber 84 is adapted to abuttingly engage and unseat a poppet-type emergency valve 85 which is disposed in a chamber 86 and normally biased by a helical spring 87 in said chamber into contact with an annular valve seat rib encircling chamber 84.

Arranged coaxially with the stem 68, and at the opposite side of movable abutment 62 therefrom, is a pusher stem 88 which has sealing slidably guided contact with the wall of an aligned bore through a casing partition separating chamber 65 from a chamber 89 that is open via a passage 90 to the seating side of a backflow check valve 91 which permits fluid flow from passage 90 to a branch of brake pipe passage 17 but is biased by a helical spring 92 to positively prevent flow in the reverse direction. A helical spring 93 bears against the end wall of chamber 65 and acts through an annular spring seat 94 to bias the latter into contact with a retaining ring carried by the part of stem 88 disposed in chamber 65 for thereby normally biasing said stem to an uppermost position defined by contact of a flange 95 on said stem with the end wall of chamber 89; hence, spring 93 is effectively caged to limit the degree of its extension in the direction of movable abutment 62. With the pusher stem 88 in its uppermost position, the lower end of said stem is spaced from a coaxially arranged poppet-type accelerated release valve 96 contained in a chamber 97, for thereby permitting a helical spring 98 in chamber 97 to seat said valve against an annular valve seat rib encircling chamber 89.

Quick service valve device 59 comprises a movable abutment 99 subject opposingly to pressure of fluid in a control chamber 100 and to pressure of a helical bias spring 101 in an atmospheric chamber 102. Coaxially connected to movable abutment 99 is a cylindrical slide valve 103 having sealing slidably guided contact with the wall of an aligned bore open at one end to chamber 102.

When chamber 100 is devoid of fluid pressure, the slide valve 103 will be operatively biased by spring 101 to a normal position, in which it is shown, and in which: one elongated annular cavity 104 in said slide valve is exposed solely to branches of passage 66; and another elongated annular cavity 105 connects a passage 106 leading to a quick action chamber reduction volume 107 with a vent port 108; and an elongated cavity 109 surrounding the reduced diameter free end of said slide valve is uncovered to a passage 110 leading to a quick service volume 111, and said free end of said slide valve is spaced from a poppet-type quick service valve 112 for opening said cavity 109 to a central bore-like opening 113 that is formed in said slide valve and always open into the cavity 105. Thus, with slide valve 103 in normal position, the volumes 107, 111 will be vented, and the quick service valve 112, which is contained in chamber 64, will be seated by a helical bias spring 114 against an annular valve seat rib encircling the slide valve bore for preventing flow of air from brake pipe passage 17 to the vent port 108.

The vent valve device 60 comprises a movable abutment 115 having at one side a chamber 116 open via a passage 117 to chamber 84 and having at the opposite side a chamber 118 open to atmosphere via a passage 119, a chamber 120 and a vent protector 121. Coaxially connected to movable abutment 115 is a pusher stem 122 that is guided within an aligned bore extending between the chambers 118, 120.

When chamber 116 is charged, the free end of stem 122 is adapted to abuttingly engage a generally cup-shaped vent valve member 123, that carries an annular disc-shaped brake pipe vent valve 124, and then operatively unseat said vent valve against pressure of a helical bias spring 125 contained in a chamber 126 open to brake pipe passage 19, for locally venting the brake pipe 5 at large capacity via chamber 120.

The high pressure valve device 61 comprises a spool-type high pressure valve 127 subject opposingly to fluid pressure in a chamber 128 open to chamber 116 and to fluid pressure in a chamber 129 open to passage 170. Valve 127 is normally biased by preponderant brake pipe pressure in chamber 129 to a normal or cut-off position, in which it is shown, and in which an elongated annular cavity 130 in said valve is so disposed as to disconnect a passage 131 that leads to emergency reservoir 7 from a branch of passage 24 that leads to the brake cylinder 8.

*Operation*

To initially charge the brake apparatus, fluid under pressure is supplied to the brake pipe 5 at the locomotive in the well-known manner.

On a particular car, some of the fluid under pressure thus supplied to the brake pipe will flow at a substantially unrestricted rate via brake pipe passage 19, strainer 18 and passage 17 to chamber 16 of service valve device 10 for promptly (if it is not already there) shifting movable abutment 13 and hence service slide valve 27 to its previously defined release position, in which it is shown and in which the brake cylinder 8 is opened to atmosphere, and brake cylinder supply valve 31 is seated, and fluid under pressure will flow from the brake pipe via chamber 16 and opening 38 to passage 39 and thence via auxiliary reservoir charging choke 40 and passage 15 to the auxiliary reservoir 6 for charging the latter at the restricted rate controlled by said choke. From auxiliary reservoir passage 15 some fluid will also flow to one side of an emergency reservoir charging check valve 132 and unseat the latter against resistance of a light helical bias spring 133 and then flow via and at the rate controlled by an emergency reservoir charging choke 134 to a branch of passage 131 for charging the emergency reservoir 7 to substantial equality with auxiliary reservoir pressure and brake pipe pressure. Since the brake cylinder 8 and hence volume 42 is vented, the inshot slide valve 49 will be in the position in which it is shown for establishing connections previously described.

Meanwhile, some of the brake pipe pressure fluid will also flow at a substantially unrestricted rate via passage 17 and chamber 64 to chamber 63 of valve device 58 and thence via passage 70 to chamber 129 of valve device 61 for promptly causing the high pressure valve 127 to move to its normal position (if not already there), in which position emergency reservoir passage 131 is cut off from brake cylinder passage 24. Some brake pipe fluid will also flow from chamber 63 via a quick action chamber charging choke 135 to passage 66 for charging the quick action chamber 67 and chamber 65.

If, such as near the head of a train, brake pipe pressure in chamber 63 of device 58 should build up much more rapidly than quick action chamber pressure in chamber 65, movable abutment 62 will move against the force of caged spring 93 to an accelerated release position, in which said movable abutment through abutting contact with pusher stem 88 operatively unseats the accelerated release valve 96 for permitting emergency reservoir fluid to flow via passage 131 and a chamber 136 to chamber 97 and thence past unseated valve 96 and through chamber 89 and passage 90 to the seating side of check valve 91; however, during initial charging, brake pipe pressure in passage 17 will be higher than the pressure of emergency reservoir fluid supplied to passage 90, and hence under this condition, the backflow check valve 91 will prevent backflown of fluid under pressure from the brake pipe to the emergency reservoir.

If the quick action chamber 67 should tend to become charged from the brake pipe 5 via choke 135 at a rate exceeding that at which the emergency reservoir 7 is charged from the brake pipe via auxiliary reservoir charging choke 40, auxiliary resevoir 6 and check valve 132, fluid under pressure will flow via quick action chamber passage 66 and a choke 137 to the seating side of a spillover check valve 138 and unseat the latter against resistance of a light helical bias spring 139 and flow past said spillover check valve and via chamber 136 to emergency reservoir passage 131 for dissipating any such overcharge into the emergency reservoir 7.

Toward completion of initial charging and as pressures in chambers 63 and 65 equalize, the movable abutment 62 will be returned by pressure of caged spring 93 to a normal position in which it is shown. With movable abutment 62 in this position, accelerated release valve 96 will be seated by spring 98; supply valve 73 will be seated by spring 72; release valve 78 will be unseated from plunger 81 by spring 79; and emergency valve 85 will be seated by spring 87. With valve 78 unseated, control chamber 100 of the quick service valve device 59 will be vented via a passage 140, chamber 76, unseated valve 78, opening 81 and vent port 83, with the result that the quick service slide valve 103 will be operatively held in its previously defined normal position by pressure of spring 101. With valve 85 seated and thereby cutting off quick action chamber passage 66 from chamber 84, chambers 84, 116 and 128 of the devices 58, 60, 61 respectively, will be vented via passage 117, an atmospheric blowdown choke 141 and vented chamber 118, with the result that the brake pipe vent valve 124 will be seated and high pressure valve 127 will remain in its normal position.

Hence, at the completion of initial charging, all components will be in the respective positions in which they are shown in the drawings.

*Service application of brakes*

To effect a service application of brakes, pressure of fluid in the brake pipe 5 is reduced at the locomotive in the well-known manner at a service rate and to a degree corresponding to the degree of service application desired; whereupon the brake pipe 5 is lapped at the locomotive.

When, on a particular car, brake pipe pressure as noted in brake pipe passage 17 and hence in chamber 63 of valve device 58 is reduced a slight degree below quick action chamber pressure in chamber 65, which latter pressure cannot reduce as rapidly as brake pipe pressure due to the restricted backflow through choke 135, movable abutment 62 will be moved upwardly by preponderant effect of quick action chamber pressure in chamber 65. During this upward movement of movable abutment 62 and hence of stem 68 and valve seat member 74, the relatively strong spring 72 will act through valve 73 to shift the fluted stem 77 and valve 78 upwardly against resistance of the weaker spring 79 until valve 78 is seated against plunger 80 and cuts off control chamber 100 from vent port 83. After valve 78 has seated, the spring 87 will hold the plunger 80 stationary unless and until brake pipe pressure is reduced more than a certain degree below quick action chamber pressure; and hence as the movable abutment 62 and valve seat member 74 continue to move upward, the latter will be carried out of seating contact with valve 73 because valve 73 will be held stationary by abutting contact with fluted stem 77 which in turn is held stationary through seating of valve 78 against the then stationary plunger 80. Upward movement of movable abutment 62 can continue until the lower metallic face of valve 73 is engaged by a shoulder 73a formed in stem 68 in encirclement of spring 72, whereupon the force of relatively strong spring 87 will act through plunger 80, seated valve 78, stem 77, and the valve 73 to oppose further upward movement of said movable abutment because said certain degree of reduction in brake pipe pressure below quick action chamber pressure will not be exceeded during a service application for reasons now to be described.

With valve 73 unseated from valve seat member 74, brake pipe pressure fluid will flow via chamber 63, passage 70, chamber 69, recess 71 and past unseated valve 73 and along fluted stem 77 to chamber 76 and thence via passage 140 to control chamber 100 of quick service valve device 59, with the result that in a fraction of a second pressure in chamber 100 will exceed a predetermined value, such as about 15 p.s.i. as determined by the value of spring 101, and cause movable abutment 99 to shift against resistance of spring 101 and thus carry quick service slide valve 103 to a quick service position, defined by contact of movable abutment 99 with a stop surface 142 provided in the end wall of chamber 102.

During this movement of quick service slide valve 103 to its quick service position, the free end of said slide valve will first sealingly abut quick service valve 112, for cutting off the passage 110 and thereby the quick service volume 111 from the vent port 108; and then said slide valve will unseat quick service valve 112 for permitting brake pipe pressure fluid to flow via passage 17 and past unseated valve 112 to cavity 109 and thence via passage 110 to the then vented quick service volume 111 for causing a prompt limited local quick service reduction in brake pipe pressure of a chosen degree, such as about 1 p.s.i.; and then, during the final stage of movement of quick service slide valve 103 to quick service position but only a split second later, an O-ring 143, which is disposed between the slide valve cavities 104 and 105 and is normally disposed to uncover passage 106 to cavity 105 and vent port 108 for venting quick action chamber reduction volume 107, will be carried downwardly past the mouth of passage 106 for successively cutting off said volume 107 from vent port 108 and then connecting volume 107 to cavity 104 so as to thereby permit fluid under pressure from the quick action chamber 67 to flow via passage 66, cavity 104, and passage 106 to said volume 107 for causing a prompt reduction in quick action chamber pressure of a chosen greater degree, such as about 1½ p.s.i.

It should be noted that since the quick service reduction in quick action chamber pressure is of a greater degree than the local quick service reduction in brake pipe pressure, the rate of reduction in quick action chamber pressure will accordingly be greater than the rate of quick service reduction in brake pipe pressure. It should also be noted that although volume 107 is smaller than quick service volume 111, volume 107 will effect a greater quick service reduction in quick action chamber pressure than the quick service volume effects in brake pipe pressure because the volume of the quick action chamber is substantially smaller than the brake pipe volume on each car; and that any desired ratio in the respective degrees of quick service reductions in brake pipe pressure and quick action chamber pressure can be obtained according to the selected sizes of the volumes 111 and 107 in relation to the known volumetric ratios of the brake pipe volume and volume of the quick action chamber 67.

This chosen greater degree of quick service reduction in quick action chamber pressure is sufficient to cause quick action chamber pressure in chamber 65 of valve device 58 to be reduced below brake pipe pressure in chamber 63 and thus cause movable abutment 62 to be returned to its normal position, in which it is shown, with the result that valve seat member 74 will successively seat against valve 73 for cutting off quick service valve control chamber 100 from the brake pipe 5 and then valve 78 will be useated by spring 79 from plunger 80 for opening chamber 100 to vent port 83. As pressure in control chamber 100 is thus released to atmosphere, movable abutment 99 and hence slide valve 103 of valve device 59 will be returned to normal position, in which they are shown, by pressure of spring 101. During this return movement of slide valve 103, the quick action chamber reduction volume 107 will be successively disconnected from quick action chamber 67 and then connected via cavity 105 to vent port 108; and then quick service valve 112 will be seated by spring 114, following which slide valve 103 will be retracted out of sealing contact with valve 112 and thus open quick service volume 110 to vent port 108 via cavity 109 and valve opening 113.

Thereafter, the valve devices 58 and 59 will operate repeatedly and in the sequence just described to continually cause limited quick service reductions in brake pipe pressure of a chosen degree and then in quick action chamber pressure of a chosen greater degree so long as brake pipe pressure is being reduced at a service rate at the locomotive and thus permits the requisite differential to be developed across movable abutment 62 of valve device 58 to initiate the sequential operation. It will be apparent that after the brake pipe 5 is lapped at the locomotive, the quick service reductions in brake pipe pressure and quick action chamber pressure will terminate as soon as a cycle is completed by return of the movable abutment 62 to its normal position, in which it is shown.

Meanwhile, as brake pipe pressure is reduced on a particular car through reduction in brake pipe pressure at a service rate at the locomotive and by the continual quick service reductions locally effected on such car, in the manner above described, movable abutment 13 and hence slide valve 27 of service valve device 10 will be moved upwardly by preponderant auxiliary reservoir pressure in chamber 14 to an application position, defined by contact of movable abutment 13 with a stop surface 144 formed in the end wall of chamber 16; it being noted that auxiliary reservoir pressure cannot reduce as rapidly as brake pipe pressure due to restricted backflow of auxiliary reservoir fluid via choke 40 into the brake pipe 5. During this upward movement of slide valve 27, an O-ring 145 carried by said slide valve will ride past the mouth of passage 39 for sealing off passageway 38 from passage 39 to thereby seal off the brake pipe from auxiliary reservoir 6; and then the free end of said slide valve will sealingly abut brake cylinder release valve 28 for closing the brake cylinder release communication 26, 25, 24, 23, 34, 35, 36, 37, 9 and then through abutting contact with said valve 28 operatively, through the medium of stem 30, unseat the brake cylinder supply valve 31 against resistance of light springs 29, 33 for permitting fluid under pressure to flow from auxiliary reservoir 6 via passage 15, past unseated valve 31, to chamber 23 and thence via passage 24, brake cylinder application choke 25 and passage 26 to the brake cylinder 8.

When auxiliary reservoir pressure has been reduced by flow to the brake cylinder 8 to substantially the reduced value of brake pipe pressure, the slide valve 27 will assume a lap position, in which the brake cylinder supply valve 31 is seated by spring 33 for cutting off flow to the brake cylinder, but stem 30 is in contact with the underside of valve 31 and release valve 28 is pressed by spring 29 into seating contact with the free end of slide valve 27 for maintaining the brake cylinder release communication closed, with the result that brake cylinder pressure will be bottled up at a value corresponding to the extent of reduction in brake pipe pressure below its normal charge value.

Meanwhile, however, some of the auxiliary reservoir pressure fluid supplied to passage 24 will initially flow via baffle choke 46 and passage 45 to chamber 44 and thence past unseated inshot valve 50 and via cavity 52, passage 53, inshot choke 54, and passage 26 to the brake cylinder 8 for supplying fluid under pressure to the latter at a relatively fast rate as controlled by choke 54, and in bypass of the more restricted choke 25, until brake cylinder pressure, as noted in volume 42 via choke 43 and chamber 44, has increased to a chosen value, such as about 10 p.s.i., sufficient to effect take-up of slack in the brake rigging and a very light degree of brake application; whereupon, the movable abutment 41 of inshot valve device 11 will be shifted by pressure of fluid in volume 42 and against the force of spring 47 for carrying slide valve 49 to a position in which inshot valve 50 is seated by spring 51 for closing the inshot communication just described, following which auxiliary reservoir pressure fluid will be supplied to the brake cylinder solely via and at the rate controlled by brake cylinder application choke 25.

It is also to be noted that whenever the slide valve 27 of service valve device 10 is in its application position and in its lap position, as above described, an O-ring 146 carried by said slide valve will be disposed above the mouth of a passage 147 for permitting brake pipe pressure fluid to flow via chamber 16 and along a reduced diameter part of said slide valve to passage 147, and thence at the very restricted rate controlled by a choke 148 to the seating side of check valve 57, and unseat and flow past the latter to passage 56, whence it may flow via cavity 55 in the inshot slide valve 49, when in its inshot-valve-opening position, to a branch of passage 53 for supplying fluid under pressure from the brake pipe 5 to the brake cylinder 8 via and at the rate controlled by inshot choke 54, and in bypass of choke 25, until the inshot slide valve 49 is moved to its inshot-valve-closing position by fluid pressure in volume 42; whereupon, cavity 55 will be so positioned as to disconnect the passages 56, 53 and thereby prevent such flow from the brake pipe to the brake cylinder. As above noted, brake pipe pressure fluid can also flow to passage 56 when the service slide valve 27 is in lap position; this communication is then established so that if, due to leakage, brake cylinder pressure and hence pressure in volume 42 should reduce to below the illustrative valve of 10 p.s.i. and thus cause spring 47 to shift inshot slide valve 49 to its inshot-valve-opening position, fluid can flow from the brake pipe to the brake cylinder for maintaining brake cylinder pressure against leakage at a rate not exceeding the flow capacity of choke 148, which flow capacity is less than that of the quick action chamber charging choke 135 to prevent undesired operation of valve device 58. Since leakage of brake cylinder pressure will be especially troublesome when brakes are lightly applied for long periods, such as while descending a long grade, it will be seen that brake cylinder pressure can, except under excessive leakage conditions, be maintained sufficiently to keep brakes on a car with a leaking brake cylinder applied to at least a degree corresponding to the light degree of brake application effected at the attained brake cylinder pressure at which inshot valve 50 is closed.

It will be noted that the service valve device 10 is a pressure balanced valve device because of the arrangement of valves 28, 31 and the fact that the area of stem 20 exposed to brake cylinder pressure in chamber 21 is equal to the area of slide valve 27 exposed either directly (with slide valve 27 in release position) or indirectly (with said slide valve in application or lap position) to fluid at the same pressure in chamber 23.

*Release of a service application of brakes*

To release a service application of brakes, fluid under pressure is supplied to the brake pipe 5 at the locomotive in the well-known manner. On a particular car, the increase in brake pipe pressure noted via passage 17 in chamber 16 of service valve device 10 will cause the movable abutment 13 and hence slide valve 27 to be shifted to release position, in which as more fully explained in connection with initial charging, the brake cylinder 8 will be vented and the auxiliary reservoir 6 will be charged to equality with brake pipe pressure. As also explained in connection with initial charging, brake pipe pressure in chamber 63 of valve device 58 will, especially on cars near the head of the train, temporarily exceed quick action chamber pressure in chamber 65 and cause the movable abutment 62 to be shifted, against the force of caged spring 93, to its accelerated release position in which it operatively, through pusher stem 88, unseats accelerated release valve 96; whereupon, fluid under pressure will flow from the emergency reservoir 7 through passage 131, and chambers 136, 97 and past unseated valve 96 to chamber 89 and passage 90 and then unseat and flow past backflow check valve 91 to brake pipe passage 17 for causing a local brake pipe pressure increase wave which will be propagated rearward from car to car through the train for more uniformly initiating a release of brakes throughout the train. Fluid under pressure may also flow from the brake cylinder 8 via a branch of passage 24 to the seating side of a check valve 150 and then unseat the latter against the pressure of a light bias spring 151 and flow into the emergency reservoir passage 131, if emergency reservoir pressure should be reduced below brake cylinder pressure in consequence of the backdumping of emergency reservoir fluid into the brake pipe.

This backdumping of emergency reservoir pressure fluid into the brake pipe will continue until emergency reservoir pressure is reduced to substantially the existing value of brake pipe pressure; whereupon backflow check valve 91 will be seated by pressure of spring 92. Thereafter, when the quick action chamber 67 and chamber 65 have been charged via choke 135 to within a preselected degree of brake pipe pressure, as determined by the value of caged spring 93, the movable abutment 62 will be shifted to its normal position.

Thus, following release of a brake application, all components will once again be in the respective positions in which they are shown in the drawings.

Emergency application of brakes

To effect an emergency application of brakes, the brake pipe pressure is reduced at an emergency rate either at the locomotive or by operation of such as a conductor's valve, in the well-known manner.

On a particular car, the movable abutment 62 of valve device 58 will promptly move upward and, as during a service application of brakes, successively cause seating of valve 78 and then unseating of valve 73 and engagement of stem shoulder 73a with valve 73; but since the brake pipe is being vented at an emergency rate, the fluid pressure differential across movable abutment 62 will increase sufficiently, despite the quick service reduction in quick action chamber pressure effected by the quick service valve device 59, to cause movable abutment 62 to continue to move upwardly and through engagement of stem shoulder 73a with valve 73, move the latter upwardly for thereby, through the medium of stem 77 and seated valve 78 and plunger 80, operatively unseating emergency valve 85 against the relatively strong force of spring 87. With valve 85 unseated, quick action chamber pressure fluid will flow via passage 66 and past said valve to passage 117 and thence to chambers 116 and 128 of valve devices 60 and 61, respectively.

Pressure of fluid thus supplied to chamber 116 of vent valve device 60 will shift movable abutment 115 so as to operatively, through stem 122, unseat brake pipe vent valve 124 against the force of spring 125 and thereby establish a large capacity flow connection between brake pipe passage 19 and atmospheric chamber 120 for locally venting the brake pipe 5 at a rapid rate and thus propagating the emergency brake pipe pressure reduction wave rearward through the train. Pressure of fluid supplied to chamber 128 of high pressure valve device 61 will exceed the rapidly reducing brake pipe pressure in chamber 129 and cause high pressure valve 127 to shift to an emergency position in which valve cavity 130 connects the passages 131 and 24 and thus causes fluid under pressure in the emergency reservoir 7 to equalize into the brake cylinder 8.

Meanwhile, auxiliary reservoir pressure in chamber 14 of service valve device 10 will preponderate over reducing brake pipe pressure in chamber 16 and cause movable abutment 13 and hence slide valve 27 to be shifted to and, in view of the venting of the brake pipe, remain in application position, and hence cause auxiliary reservoir pressure to equalize into the brake cylinder 8 via unseated valve 31. Thus, during an emergency application, brakes will be applied to a degree corresponding to the brake cylinder pressure attained by equalization of both auxiliary reservoir pressure and emergency reservoir pressure into the brake cylinder.

Thereafter, fluid pressure in quick action chamber 67 and in chambers 116 and 128 will blow down to atmosphere via and at the restricted rate controlled by the timing or blowdown choke 141. After a predetermined period, such as about one minute, as determined by the capacity of timing choke 141, fluid pressure in chamber 116 will be reduced sufficiently to permit spring 125 to reseat the brake pipe vent valve 124 and thus terminate local venting of the brake pipe and thus enable effective recharging of the brake pipe for releasing the emergency brake application. When the quick action chamber 67 is substantially vented, the emergency valve 85 will be reseated by spring 87 for cutting off the quick action chamber from the blowdown choke 141 and thus enable effective recharging of the quick action chamber 67.

Release of an emergency application of brakes

After the brake pipe vent valve 124 and emergency valve 85 have been reseated, the emergency application of brakes may be released by supplying fluid under pressure to the brake pipe 5 at the locomotive.

On a particular car, brake pipe pressure supplied to chamber 63 of valve device 58 will cause movable abutment 62 to promptly shift to its accelerated release position, in which it operatively unseats valve 96 for permitting fluid under pressure from the emergency reservoir 7 to be supplied via passage 131, past valves 96 and 91 to the brake pipe 5, as during release of a service application. Also, fluid under pressure will flow from the brake cylinder 8 past check valve 150 to emergency reservoir passage 131. It will also be noted that auxiliary reservoir fluid will initially flow into the brake pipe 5 by way of unseated brake cylinder supply valve 31 of device 10 and check valve 150, because valve 31 will be maintained unseated by movable abutment 13 until brake pipe pressure has increased to substantially the existing value of auxiliary reservoir pressure. Thus, during release of an emergency application of brakes, fluid pressures in the emergency reservoir 7, brake cylinder 8 and auxiliary reservoir 6 will tend to equalize into the brake pipe via communications just described, following which the check valve 91 will be seated by spring 92.

The brake apparatus will thereupon be recharged in substantially the same manner as described in connection with initial charging.

Having now described the invention, what we claim as new and desire to secure by Letters Patent is:

1. In a fluid pressure brake apparatus of the type comprising a normally charged brake pipe and a chamber normally charged with fluid at substantially the normal charge value of brake pipe pressure via a restriction, the combination of valve means operative to selectively supply fluid under pressure to or release fluid under pressure from another chamber according to whether brake pipe pressure is less than or is at least substantially equal to pressure in the first-mentioned chamber, and quick service valve means responsive to charging of said other chamber to effect a limited degree of local quick service reduction in brake pipe pressure and also effect a limited greater degree of quick service reduction in pressure in the first-mentioned chamber, whereby upon an operator-effected reduction in pressure of fluid in the brake pipe at a rate not exceeding a certain rate, the first-mentioned valve means will be caused to continually operate to successively charge and vent said other chamber for effecting repeated limited reductions in brake pipe pressure and pressure in the first-mentioned chamber until such operator-effected reduction in brake pipe pressure is terminated.

2. In a fluid pressure brake apparatus of the type comprising a normally charged brake pipe and a chamber having restricted connection with the brake pipe, the combination of valve means normally in one position for venting another chamber and responsive to a reduction in brake pipe pressure below the pressure in the first-mentioned chamber to another position to effect supply of fluid under pressure to said other chamber, and quick service valve means responsive to charging of said other chamber to effect one rate of quick service reduction in brake pipe pressure and effect a greater rate of quick service reduction in pressure in the first mentioned chamber, whereby during an operator-effected brake pipe pressure reduction at a rate not exceeding said greater rate, said first-mentioned valve means will repeatedly cycle between its said other and one positions for periodically causing said quick service valve means to effect limited quick service reductions in brake pipe pressure and in pressure in the first-mentioned chamber.

3. In a fluid pressure brake apparatus of the type comprising a normally charged brake pipe and a quick action chamber having restricted connection with the brake pipe, the combination of valve means normally in one position for venting another chamber and responsive to a reduction in brake pipe pressure below quick action chamber pressure to another position to effect supply of fluid under pressure to said other chamber, a quick service volume, a quick action chamber reduction volume, and quick service valve means normally positioned to vent both of said volumes and responsive to charging of said other chamber to connect the brake pipe to said quick service volume and connect the quick action chamber to said reduction volume, the capacity of said reduction volume being such in relation to the capacities of said quick service volume and brake pipe and quick action chamber as to effect, when such connections are established, a greater degree of reduction in quick action chamber pressure than is effected in brake pipe pressure by said quick service volume when brake pipe pressure is being reduced at a service rate, thereby to cause the first-mentioned valve means to continually cycle between its said other and one positions while brake pipe pressure is being reduced at a service rate, said first-mentioned valve means being rendered incapable of such cycling during an emergency rate of reduction in brake pipe pressure because brake pipe pressure will then be rapidly reduced to a degree exceeding said greater degree of reduction in quick action chamber pressure.

4. In a fluid pressure brake apparatus of the type comprising a quick action chamber having restricted connection with a normally charged brake pipe, a brake pipe vent valve means biased to a closed position and opened responsively to pressurization of a control chamber having restricted communication with the atmosphere, and a normally closed emergency valve means controlling connection of the quick action chamber with the control chamber, the combination of quick service valve means operative only upon charging of a normally vented other chamber for effecting one rate of local quick service reduction in brake pipe pressure and also effecting a quick service reduction in quick action chamber pressure at a rate greater than said one rate but less than that corresponding to an emergency rate of reduction in brake pipe pressure, and a combined emergency and quick service pilot valve device normally positioned for venting said other chamber and responsive to a service rate of reduction in brake pipe pressure below quick action chamber pressure to charge said other chamber, said valve device being responsive to an emergency rate of reduction in brake pipe pressure below quick action chamber pressure to not only charge said other chamber but also operatively open the emergency valve means for charging the control chamber and thus opening the brake pipe vent valve means, the vent valve means being maintained open until fluid pressure in the control chamber and quick action chamber have blown down via the restricted communication to below a selected value, whereby upon a service rate of reduction in brake pipe pressure the emergency valve means will remain closed and said valve device and quick service valve means will successively and repeatedly cycle for effecting repeated limited and limited greater degrees of reduction in brake pipe pressure and quick action chamber pressure, respectively, so long as brake pipe pressure is being reduced at a service rate, whereas upon an emergency rate of reduction in brake pipe pressure the emergency valve means will be opened and said quick service valve means will move once to and remain in its said other position until said valve device is returned to its normal position responsively to substantial venting of the quick action chamber by way of the emergency valve means and restricted communication.

5. A fluid pressure brake apparatus comprising a normally charged brake pipe, quick service pilot valve means controlled by brake pipe pressure opposing pressure of fluid in one chamber having restricted connection with the brake pipe, said pilot valve means being biased to a normal position for venting another chamber and responsive to a reduction in brake pipe pressure below the pressure in said one chamber to supply pressure fluid from said brake pipe to said other chamber, two volumes, and quick service valve means responsive to venting of said other chamber to vent both of said volumes and responsive to pressurization of said other chamber to connect the brake pipe to one of said volumes for effecting a limited degree of local quick service reduction in brake pipe pressure and also connect said one chamber to the other of said volumes for effecting a limited greater degree of local quick service reduction in pressure in said one chamber, thereby to cause said pilot valve means to successively repeatedly supply brake pipe pressure fluid to and release brake pipe pressure fluid from said one chamber and thus cause repeated operation of said quick service valve means while and so long as brake pipe pressure is being reduced.

References Cited in the file of this patent

UNITED STATES PATENTS

| | | |
|---|---|---|
| 562,773 | Parke | June 23, 1896 |
| 868,481 | Ransom | Oct. 15, 1907 |
| 1,510,225 | Howard | Sept. 30, 1924 |
| 1,615,368 | Farmer | Jan. 25, 1927 |
| 2,087,624 | Farmer | July 20, 1937 |
| 2,830,850 | McClure et al. | Apr. 15, 1958 |